Patented July 8, 1924.

1,500,700

UNITED STATES PATENT OFFICE.

ERNEST BLAKER, OF AKRON, OHIO, ASSIGNOR TO THE B. F. GOODRICH COMPANY, OF NEW YORK, N. Y., A CORPORATION OF NEW YORK.

METHOD OF VULCANIZING.

No Drawing.   Application filed July 6, 1922.   Serial No. 573,237.

*To all whom it may concern:*

Be it known that I, ERNEST BLAKER, a citizen of the United States, residing at Akron, in the county of Summit and State of Ohio, have invented a certain new and useful Method of Vulcanizing, of which the following is a specification.

This invention relates to the art of vulcanizing articles, and especially hollow articles, composed in whole or in part of vulcanizable material, such as rubber and fabric tire casings, where fluid is conducted into the interior of the article or a distensible member adapted to bear against it, either to heat the article or to expand it, usually against a mold. In some of its features my invention is applicable to such vulcanizing operations whether the heating or distending fluid be applied directly to the surface of the article or to an expansible member adjacent the article, but it is especially advantageous in the vulcanizing of pneumatic tire casings where the casing, prior to or during vulcanization, is expanded, against a mold by a distensible core or bag, and I will describe my invention herein with particular reference to this operation, without, however, wholly limiting my claims thereto.

My chief objects are to shorten the time of vulcanization, to secure uniform vulcanization throughout parts of the article, and to avoid deterioration of the article or of the distensible member. Further, more specific objects will appear hereinafter.

When a fluid such as steam or water is applied to the distensible member or the article to be vulcanized as in prior practice, especially if the article or the distensible member is not vented for the escape of air, a considerable time is required for heating the article to vulcanizing temperature, the article is not heated uniformly throughout, and the inner walls of the article or the core within it may be damaged during the vulcanizing heat. Such damage is particularly noticeable in the case of rubber cores which are used in successive vulcanizing operations, their inner surfaces becoming hardened and cracked.

Another consideration having relation to my invention is that in vulcanizing pneumatic tire casings, and especially those of the larger sizes, saturated steam at the temperature appropriate for vulcanizing may not have sufficient pressure properly to stretch the casing against the mold, and, moreover, condensation of the steam within the core results in the accumulation of water in the lower part of the core, so that both steam and water are present as heating and expanding media, which may result in unequal vulcanization due to the comparative sluggishness of the water in responding to changes in the temperature of the steam. In order to obtain sufficient internal fluid pressure to expand the tire without such excessive temperature as would prevail in saturated steam at the desired pressure, water at the desired temperature and under such pressure as will expand the tire and prevent the conversion of the water into steam has been used as a heating and distending medium. A disadvantage inheres in such use of water as it has heretofore been practiced, however, in that the water cools in giving up its heat to the core and tire, and as circulation of the water to maintain its temperature is a matter of difficulty and is not completely effective to keep the temperature within the tire sufficiently high and uniform, the heating and expanding of the tire by means of such high-pressure water has not been entirely satisfactory.

My method results in securing quick and substantially uniform heating of the tire, in avoiding damage to the inner surface of the core, and in maintaining the water, when it is used as a heating and distending medium, at nearly the same uniform temperature at which it is introduced into the core.

The damaging of the core and the unequal heating of respective parts of the tire are believed to be largely due to the presence of entrapped air within the core, which, at the temperatures employed, oxidizes the adjacent surface portion of the core, and acts as a heat insulator, or at least as a poor heat conductor, between the heating medium and the tire. Where high-pressure water is used as the heating and expanding medium, the air of course collects in a body at the upper side of the cavity, so that its effects are definitely concentrated in that region. When water at 300° F. and 250 lbs. gauge pressure is used, for example, the volume of the entrapped air after it is compressed by the water may be in the neighborhood of 8% of the capacity of the core. In case steam is used, the air may mix with the steam, and its effects thus be scattered throughout the interior of the core, but its presence is nevertheless a detriment, in preventing rapid and uniform heating of the tire and in oxidizing the core.

In practising my method, I substantially rid the core of entrapped air, and may do so without providing a special vent for its escape, by first filling the core with steam, preferably saturated steam, at substantial pressure, preferably near 100 lbs. gauge pressure, corresponding to about 338° F., and preferably maintain such steam pressure for a sufficient period, usually from 3 to 8 minutes, depending upon the temperatures used and the size of the tire, for a considerable quantity of steam to give up part of its heat to the core and the tire and condense to water in the core. This water of condensation, collecting in the bottom of the core, is under the same pressure and at about the same temperature as the steam, although it may continue to give up some of its heat to the core and tire. The tire is thus initially heated and softened so that it may subsequently be expanded against the mold, and this initial heating of the tire and core serves other purposes, as presently will be explained.

At the end of this initial heating period, as described, I shut off the core from the source of steam supply and open its steam inlet to the atmosphere, whereupon the water of condensation within the core, being at a temperature much higher than its normal boiling point, in part flashes back into steam, which mixes with the entrapped air within the core and carries it out of the latter. This blow off may continue for several minutes, depending upon the temperature used, the size of the tire and the capacity of the outlet. The residual heat in the core or water bag and the tire, flowing back to the condensed water, may prolong the period of the blow off.

As soon as the steam pressure within the core has fallen substantially to that of the atmosphere, as evidenced by the slackened flow of steam, and before the temperature of the core or the conduit has so fallen as to condense the residuum of steam within it and thus cause a return flow of air, I shut off the vent and preferably again turn a heating or expanding medium into the core. The filling of the core with steam and the blow off may be repeated, to further reduce the quantity of entrapped air, before the final heating or expanding medium is introduced, but in practice I find that one initial heating and blow off of substantial length is sufficient to obtain very good results.

An additional quantity of a heating or expanding medium, such as steam or water may be introduced, as stated, after the blow-off. In case high-pressure water is to be used, I prefer first to introduce additional steam, as it may be more quickly introduced and more easily regulated as to temperature than water, the purpose of this steam being to keep the article hot while the water is brought exactly to the desired temperature and let into the core. The steam may also further soften the tire before the latter is finally expanded by the water. The water of course condenses the steam within the core, so that, in this instance, the final distending medium is water.

As the tire is at a temperature near, and possibly higher than, that of the final heating or distending medium when the latter is introduced, such medium is not required to give up an excessive quantity of its heat to the tire, and excessive condensation in the case of steam, or excessive cooling in the case of water, is avoided.

Vulcanizing heat may be applied to the tire through the mold at any time during the operations above described, but I prefer, in the manner described, first to warm the casing thoroughly from the inner side, softening and expanding it, and then apply heat thereto through the mold by applying steam to the outer surface of the mold at a lower pressure than that within the tire.

Since the blow off may be stopped as soon as a sufficient quantity of steam has evolved from the hot water within the tire to carry off entrapped air, but while a substantial quantity of residual water, at a temperature far above its normal boiling point, or a corresponding quantity of residual high pressure steam, still remains in the tire, the tire may be vulcanized under internal pressure due to the presence of the residual fluid therein, or the residual fluid and such additional fluid as may be introduced as described, and such internal pressure, the mold being of the usual two part type, vented at its parting plane, presses the wall of the tire against the mold during vulcanization.

In ridding the core or tire of entrapped air without the provision of a special vent for its escape, as above stated, my invention has the advantage over prior methods that inexpensive equipment, and equipment of types already established, may be economically and conveniently used without the harmful effects of entrapped air. My invention also provides for quick but properly controlled heating of the interior portions of the article. The use of a distending medium the pressure of which may be controlled independently of its temperature results in well controlled expansion and uniform and quick vulcanization of the article.

I do not wholly limit my invention to the exact procedure described, as the method may be variously modified within the scope of my invention.

I claim:

1. The method of vulcanizing a hollow article which comprises enclosing the article in a mold, mixing with the air in said article an innocuous fluid under pressure while preventing escape of said air and said fluid, such escape being prevented for such time as to produce a substantially complete diffusion of said air and fluid, then permitting a part of the mixture to escape to dispose of a part of said air, shutting off said escape, and vulcanizing said article while it is thus rid of air.

2. The method of vulcanizing an article which comprises encompassing a body of air adjacent said article, conducting steam into the encompassing means and there confining it for such time and at such pressure that a substantial quantity of it condenses to water at a temperature substantially above 212° F., then venting the encompassing means to permit condensation water therein to revert to steam and pass off with a part of said air, stopping the escape of said steam before the cooling of its residuum causes a substantial return flow of air, and vulcanizing said article while the encompassing means is thus rid of air.

3. The method of vulcanizing an article which comprises encompassing a body of air adjacent said article, conducting steam into the encompassing means and there confining it for such time and at such pressure that a substantial quantity of it condenses to water at a temperature substantially above 212° F., then venting the encompassing means to permit condensation water therein to revert to steam and pass off with a part of said air, stopping the escape of said steam before the cooling of its residuum causes a substantial return flow of air, increasing the pressure of said residuum by the introduction of additional fluid, and heating the article under pressure of said residuum and additional fluid.

4. The method of vulcanizing a hollow article which comprises externally confining the article, introducing steam to the space within the article and there confining it for such time and at such pressure as to cause a substantial quantity of it to condense to water, at a temperature substantially above 212° F., by loss of heat to the confining means, venting the latter to permit condensation water therein to revert to steam and pass off with a part of said air, stopping the escape of said steam before the cooling of its residuum causes a substantial return flow of air into the article, increasing the pressure of said residuum by the introduction of hot water under pressure greater than that due to its temperature, and heating the article under pressure of said water.

5. The method of vulcanizing a hollow article which comprises, enclosing the article in a mold, introducing steam to the space within the article and there confining it for such time and at such pressure as to cause a substantial quantity of it to condense to water, at a temperature substantially above 212° F., by loss of heat to the confining means, venting the latter to permit condensation water therein to revert to steam and pass off with a part of said air, stopping the escape of said steam before the cooling of its residuum causes a substantial return flow of air into the article, keeping said residuum hot by the introduction of additional steam, increasing the pressure of said residuum and additional steam by the introduction of hot water under pressure, and heating the article under pressure of said water.

6. The method of vulcanizing a tire which comprises enclosing the tire in a mold, mounting a distensible bag in the tire, conducting steam into the bag, venting the bag through its steam inlet to dispose of entrapped air, stopping the escape of said steam before the cooling of its residuum causes a return flow of air into the bag, and vulcanizing the tire while the bag is thus rid of air and while holding the tire distended by fluid pressure within the bag.

7. The method of vulcanizing a tire which comprises externally confining the tire, mounting a distensible bag therein, conducting steam into the bag and there confining it for such time and at such pressure as to cause a part of it to condense to water at a temperature above 212° F., venting said bag to permit the condensation water to revert to steam and pass off with a part of the air entrapped in the bag, stopping the escape of said steam before the cooling of its residuum causes a return flow of air into the bag, increasing the pressure of said residuum by the introduction of additional fluid, and heating the tire under pressure of said additional fluid.

8. The method of vulcanizing a tire which comprises externally confining the tire, mounting a distensible bag therein, conducting steam into the bag and there confining it for such time and at such pressure as to cause a part of it to condense to water at a temperature above 212° F., venting said bag to permit the condensation water to revert to steam and pass off with a part of the air entrapped in the bag, stopping the escape of said steam before the cooling of its residuum causes a return flow of air into the bag, conducting water into said bag, and heating the tire under pressure of said water.

9. The method of vulcanizing a tire which comprises externally confining the tire, mounting a distensible bag therein, conducting steam into the bag and there confining it for such time and at such pressure as to cause a part of it to condense to water at a temperature above 212° F., venting said bag to permit the condensation water to revert to steam and pass off with a part of the air entrapped in the bag, stopping the escape of said steam before the cooling of its residuum causes a return flow of air into the bag, keeping said residuum hot by the introduction of additional steam, increasing the pressure of and condensing said residuum and additional steam by the introduction of hot water under pressure greater than that due to its temperature, and heating the tire under pressure of said water.

In witness whereof I have hereunto set my hand this 3rd day of July, 1922.

ERNEST BLAKER.